(12) United States Patent
Lisso et al.

(10) Patent No.: US 12,307,412 B2
(45) Date of Patent: May 20, 2025

(54) SYSTEMS AND METHODS FOR PREPARING DIRECT-TO-CUSTOMER SHIPMENTS

(71) Applicant: Target Brands, Inc., Minneapolis, MN (US)

(72) Inventors: Gregory Lisso, Minneapolis, MN (US); Jonathan Crepeau, Minneapolis, MN (US); Rebecca Swartz, Minneapolis, MN (US); Daryl Glass, Minneapolis, MN (US); Tyler Park, Minneapolis, MN (US); David Sellner, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 47 days.

(21) Appl. No.: 18/087,372

(22) Filed: Dec. 22, 2022

(65) Prior Publication Data
US 2023/0230025 A1    Jul. 20, 2023

Related U.S. Application Data

(60) Provisional application No. 63/301,293, filed on Jan. 20, 2022.

(51) Int. Cl.
*G06Q 10/08*    (2024.01)
*G06Q 10/0835*    (2023.01)
*G06Q 10/087*    (2023.01)

(52) U.S. Cl.
CPC ..... *G06Q 10/08355* (2013.01); *G06Q 10/087* (2013.01)

(58) Field of Classification Search
CPC .......... G06Q 10/08355; G06Q 10/08

USPC ................................ 705/338, 7.25
See application file for complete search history.

(56) References Cited

U.S. PATENT DOCUMENTS

| 11,702,304 | B2* | 7/2023 | Biasutto | G08B 5/38 414/809 |
| 11,756,428 | B2* | 9/2023 | Ranjan | G06Q 10/047 701/410 |
| 11,775,892 | B2* | 10/2023 | Mains, Jr. | G06Q 10/083 705/7.13 |

(Continued)

FOREIGN PATENT DOCUMENTS

| JP | 2012086983 A | * | 5/2012 |
| JP | 2017100855 A | * | 6/2017 |

OTHER PUBLICATIONS

Maja Piecyk et al., "Online Shopping and Last-Mile Deliveries: Briefing Report", Jan. 2021, Technical Report CUED/C-SRF/TR18, 125 pages. (Year: 2021).*

(Continued)

*Primary Examiner* — Shannon S Campbell
*Assistant Examiner* — Freda A Nelson
(74) *Attorney, Agent, or Firm* — Fish & Richardson P.C.

(57) ABSTRACT

Systems and methods can enhance efficiencies of order fulfillment processes. For example, this document describes systems and methods for efficiently processing direct-to-customer shipments at a last mile delivery ("LMD") facility. The systems and methods are focused on rapid loading, unloading and cycling of LMD delivery vehicles through the operation in a space-efficient manner. In some embodiments, the delivery vehicles are cycled through the LMD facility in organized batches to allow high throughput with fast cycle time.

10 Claims, 8 Drawing Sheets

(56) References Cited

U.S. PATENT DOCUMENTS

| | | |
|---|---|---|
| 2004/0193466 A1 | 9/2004 | Kull et al. |
| 2014/0035723 A1* | 2/2014 | Alfar .................. G05B 1/01 |
| | | 340/5.65 |
| 2014/0229399 A1 | 8/2014 | Ranganathan et al. |
| 2016/0012385 A9 | 1/2016 | Mains |
| 2016/0225115 A1 | 8/2016 | Levy et al. |
| 2019/0066033 A1* | 2/2019 | Mains, Jr. ........ G06Q 10/06311 |
| 2019/0066041 A1* | 2/2019 | Hance .................... B65G 1/137 |
| 2020/0327633 A1* | 10/2020 | Goto ...................... G06Q 10/08 |
| 2021/0334736 A1* | 10/2021 | Mains, Jr. ........ G06Q 10/06311 |
| 2023/0230023 A1* | 7/2023 | Khaleghi ........... G06Q 10/0833 |
| | | 705/7.25 |

OTHER PUBLICATIONS

"Yard Management System: How Technology Helps Increase Yard Efficiency", May 16, 2021, altexsoft.com, 38 pages (Year: 2021).*

* cited by examiner

SYSTEMS AND METHODS FOR PREPARING DIRECT-TO-CUSTOMER SHIPMENTS

CROSS-REFERENCE TO RELATED APPLICATIONS

This application claims the benefit of U.S. Provisional Application Ser. No. 63/301,293, Jan. 20, 2022. The disclosure of the prior application is considered part of (and is incorporated by reference in) the disclosure of this application.

TECHNICAL FIELD

This document relates to systems and methods for enhancing efficiencies of order fulfillment processes. For example, this document relates to systems and methods for efficiently processing direct-to-customer shipments at a last mile delivery (LMD) facility. The systems and methods are focused on rapid loading, unloading and cycling of LMD delivery vehicles through the operation in a space-efficient manner.

BACKGROUND

Customers expect their orders to be fulfilled properly and promptly on a consistent basis. Second-day deliveries are now essentially an ordinary expectation, and same-day or next-day deliveries are becoming more standard. Highly efficient warehousing, order processing, and shipping processes are required to meet these increasingly higher levels of customer expectations.

LMD, also known as last mile logistics, is the movement of goods from a transportation hub location to the final delivery destination—typically the door of the customer. The goal of LMD logistics is to deliver the packages as affordably, quickly and accurately as possible, while minimizing company costs.

LMD is considered to be the most expensive part of the order fulfillment process. The daily delivering of thousands of packages to their final destination, accurately and cost effectively, is a complex logistical challenge. Last mile order fulfillment is complicated, and many factors contribute to the overall cost.

SUMMARY

This document describes systems and methods for enhancing efficiencies of order fulfillment processes. For example, this document describes systems and methods for efficiently processing direct-to-customer shipments at a LMD facility. The systems and methods are focused on rapid loading, unloading and cycling of LMD delivery vehicles through the operation in a space-efficient manner. In some embodiments, the delivery vehicles are cycled through the LMD facility in organized batches to allow high throughput with fast cycle time.

In one aspect, this disclosure is directed to a computer-implemented method for processing direct-to-customer shipments at a building for loading delivery vehicles. The method includes: providing a notification to a vehicle driver of a point in time at which the driver is assigned to arrive at the building; receiving an indication that a vehicle driven by the vehicle driver has arrived at the building; providing a code to the vehicle driver; receiving the code from the vehicle driver; in response to receiving the code, granting the vehicle access to a queuing parking lot of the building; granting the vehicle access to the building; receiving an indication of a particular parking spot of a plurality of parking spots in the building in which the vehicle is parked; providing a notification to move one or more order items to the particular parking spot; receiving one or more codes corresponding to the one or more order items; and receiving a code that indicates that the one or more order items have been loaded into the vehicle.

Such a method may optionally include one or more of the following features. The notification to the vehicle driver may be provided via an application running on a smart phone. The notification to the vehicle driver may comprise providing a QR code to the smart phone. The receiving the indication that the vehicle has arrived at the building may comprise receiving a scan of the QR code. The granting the vehicle access to the queuing parking lot of the building may comprise removing a barrier to the queuing parking lot. The granting the vehicle access to the building may comprise opening a door through which the vehicle can enter the building. The granting the vehicle access to the building further may comprise illuminating a traffic control light. The receiving the indication of the particular parking spot in the building in which the vehicle is parked may comprise receiving a code corresponding to the particular parking spot. The one or more order items may be grouped together based on having delivery addresses within a certain geographical area. The receiving one or more codes may correspond to the one or more order items comprises receiving a barcode that is scanned from each of the one or more order items.

In another aspect, this disclosure is directed to a method for preparing direct-to-customer shipments. The method includes: receiving customer orders for a plurality of items to be delivered to a plurality of addresses; transporting the plurality of items from a retail store to a last mile delivery ("LMD") facility; storing, at the LMD facility, the plurality of items in an automated inventory buffer system; determining an optimized LMD shipment plan based on the plurality of addresses, wherein the optimized LMD shipment plan comprises a plurality of assigned routes for a plurality of delivery vehicles to follow to deliver the plurality of items; and conveying, from the automated inventory buffer system and in accordance with the optimized LMD shipment plan, the plurality of items to an area for loading the plurality of items into the plurality of delivery vehicles.

Such a method may optionally include one or more of the following features. Each assigned route of the plurality of assigned routes may be predetermined for a single delivery vehicle to follow to deliver an assigned group of items of the plurality of items. The area for loading the plurality of delivery vehicles may include multiple parking spaces. Each parking space of the multiple parking spaces may receive one delivery vehicle of the plurality of delivery vehicles. The conveying the plurality of items to the area for loading the plurality of items into the plurality of delivery vehicles may include conveying a particular assigned group of items to each parking space of the multiple parking spaces. The conveying the particular assigned group of items to each parking space may comprise conveying individual items of the particular assigned group of items in a sequence that is reversed in comparison to a sequence for delivering the individual items in accordance with the optimized LMD shipment plan. Each assigned route of the plurality of assigned routes may be predetermined based on determining a plurality of geographical areas corresponding to the plurality of addresses. Each assigned route of the plurality of assigned routes may be predetermined on a basis of minimizing a distance traveled by the plurality of delivery vehicles. Each assigned route of the plurality of assigned routes may be predetermined on a basis of balancing distances traveled by each delivery vehicle of the plurality of delivery vehicles. The automated inventory buffer system may comprise an automatic storage and retrieval system ("ASRS"). The plurality of delivery vehicles may include third-party logistic vehicles and non-professional courier vehicles.

The systems and processes described here may be used to provide one or more of the following optional benefits. First, some embodiments provide an order fulfillment and LMD delivery process that is more efficient, responsive, and agile so orders can be shipped to customers in a shorter timeframe than some current processes. Such a result can be accomplished, for example, through optimizing space and material flow through the order sortation and LMD delivery processes by reducing delays, interferences, and space requirements. Second, some embodiments of the systems and methods described herein are flexible and readily scalable to respond efficiently to increasing or decreasing order processing and shipping demands. Third, in some embodiments the labor costs associated with the order fulfillment processes can be reduced using the automated systems and processes described herein. Fourth, the systems and methods described herein can result in safety and ergonomic enhancements of order sortation and LMD delivery processes by controlling traffic flow patterns of delivery vehicle and/or by using barriers. Fifth, the systems and methods described herein are flexible and adaptable so that multiple parallel LMD delivery systems can be configured to operate in many different ways. The optimal configuration can be selected based on the volume of orders needing sortation during a particular day, shift, or partial-shift. Hence, the systems and methods facilitate efficient order sortation and LMD operations in spite of shifting requirements.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes systems and methods for efficiently processing direct-to-customer shipments at a LMD facility. The systems and methods are focused on rapid loading, unloading and cycling of LMD delivery vehicles through the operation in a space-efficient manner. In some embodiments, the delivery vehicles are cycled through the LMD facility in organized batches to ensure safety and to allow high throughput with fast cycle time.

Figure 1:
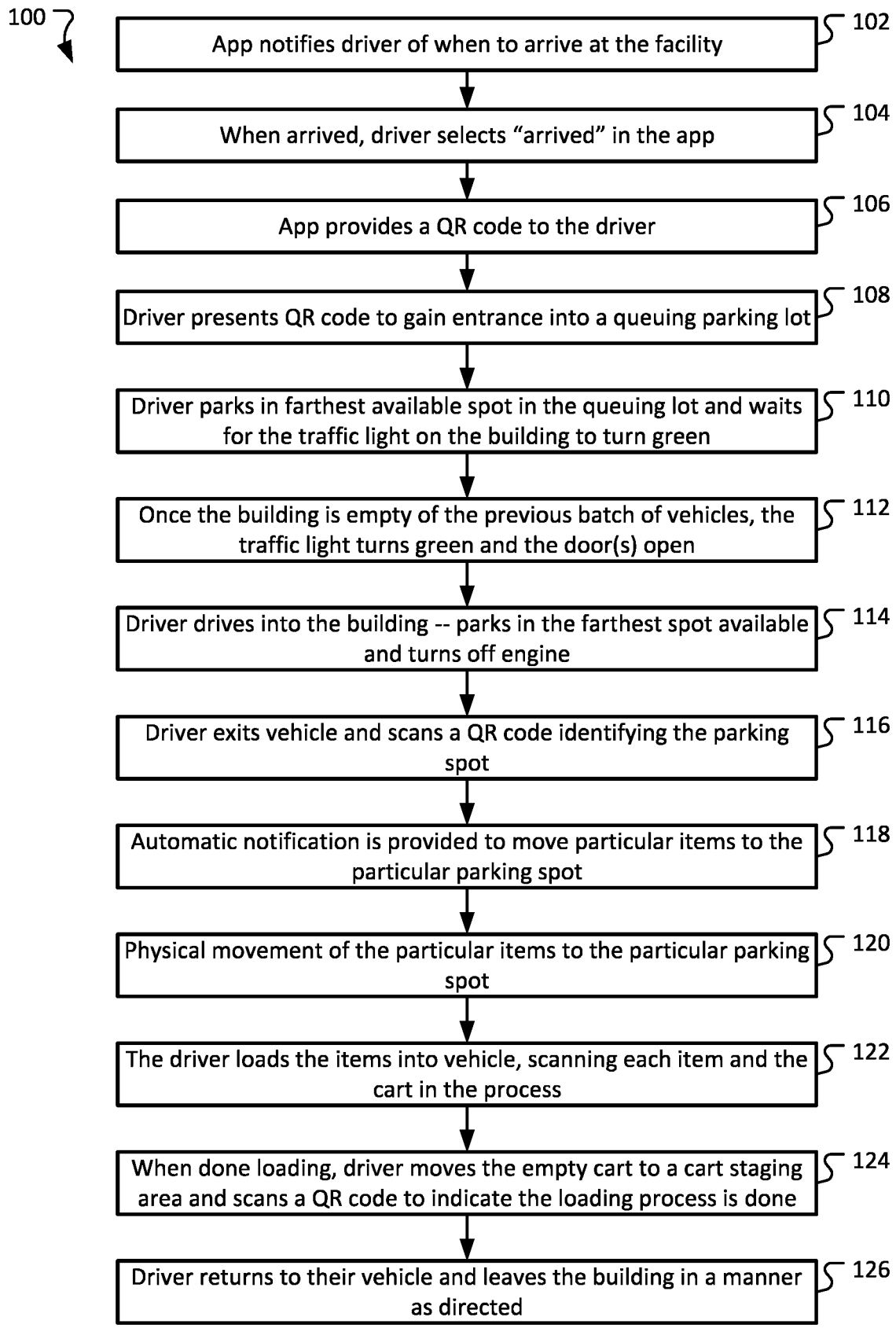
FIG. 1 is a flowchart of an example method for processing direct-to-customer shipments in accordance with some embodiments.

FIG. 1 is a flowchart depicting an example method 100 for processing direct-to-customer shipments in accordance with some embodiments. The processing of the direct-to-customer shipments can be performed at a building (e.g., a LMD facility), a warehouse, a mixing center, a flow center, a distribution center, and the like. The method 100 includes loading saleable items ordered by customers into delivery vehicles. The delivery vehicles can be any type of delivery vehicle including, but not limited to, third-party logistic vehicles (e.g., FedEx®, UPS®, etc.) and/or non-professional courier vehicles (Uber, Lyft, etc.).

In some embodiments, the method 100 (or one or more portions thereof) is computer-implemented. That is, the method 100 (or at least some steps of the method 100) can be performed/executed by (or using) one or more computer systems and/or computer devices. For example, in some embodiments some portions of the method 100 can be performed by or using mobile devices (e.g., smart phone devices) operated by the drivers of the LMD delivery vehicles. In some embodiments, portions of the method 100 can also be performed by one or more computer server systems that are executing one or more computer programs to perform the method 100, or portions thereof. Such computer system(s) will be referred to hereinafter as a LMD process control system.

In some embodiments, the method 100 also includes the performance of computerized route optimization. Route optimization is the computerized process of finding the shortest and most cost-efficient route(s) to handle a plurality of deliveries. An optimized LMD shipment plan (developed using route optimization) is determined based on the addresses to which deliveries are needed. The items to be delivered can be grouped for individual delivery vehicles based on the optimized LMD shipment plan. Accordingly, each delivery vehicle can be assigned a particular delivery route and can be loaded with the specific items to be delivered along the route. The route optimization can be performed by the LMD process control system and/or by another computer system.

In some embodiments, the method 100 can be performed at a facility that also sorts and loads items to be delivered over broad geographical areas by third-party logistic carriers such as, but not limited to, FedEx®, UPS®, and USPS®. That is, the same facility can be used to sort and load items to be delivered over broad geographical areas by third-party logistic vehicles, and also used to sort and load items to be delivered locally by LMD delivery vehicles in accordance with the method 100.

The saleable items to be processed in accordance with the method 100 can be ordered by customers for delivery. For example, in some embodiments saleable items can be ordered on-line through a retailer's website. The method 100 can also be used for other purposes such as store replenishment, store-to-store transfers, and the like.

In some embodiments, the saleable items to be processed in accordance with the method 100 can be shipped to the LMD facility from one or more retail stores. Additionally, or alternatively, in some embodiments the saleable items to be processed in accordance with the method 100 can be shipped to the LMD facility from other warehouses, from suppliers, and/or other sources.

In the flowchart of FIG. 1, the method 100 is described in the context of a single delivery vehicle driver. However, it should be understood that the same method 100 concurrently applies to multiple delivery vehicle drivers.

The method 100 utilizes a software application ("app") operating on the mobile device(s) (e.g., smart phone) of delivery vehicle drivers. In step 102 of the method 100, the app notifies the delivery vehicle driver of a point in time at which the driver is assigned to arrive at the building (e.g., the LMD facility). The notification can be provided via the driver's mobile device. In some embodiments, a range of time can be provided.

In step 104 of the method 100, the delivery vehicle driver provides an indication that the driver has arrived at the LMD facility. For example, the driver can click on a selectable input element (e.g., a soft key, icon, etc.) on his/her mobile device to provide the indication of arrival.

In step 106 of the method 100, a code is provided to the delivery vehicle driver via his/her mobile device. For example, a barcode, a QR code, or an alphanumeric code can be provided to the driver's mobile device. The code can be provided in response to the receipt of the indication that the driver has arrived at the LMD facility (which was provided in step 104).

In step 108 of the method 100, the delivery vehicle driver presents the code received in step 106 in order to gain access to a queuing parking area. For example, in some cases the driver can present the display screen of his/her mobile device to a scanner in order for the scanner to detect/read the code that was provided in step 106. In some embodiments, in response to the detection of the code, a gate or other type of traffic control barrier can be opened to allow the delivery vehicle to enter the queuing parking area.

In step 110 of the method 100, the delivery vehicle driver will drive his/her vehicle to a parking spot in the queuing parking area/lot. In some embodiments, the delivery vehicle driver will drive his/her vehicle to designated a parking spot in the queuing parking area/lot, such as the farthest available spot in the queuing parking area/lot.

In step 112 of the method 100, once the LMD facility is empty of the previous batch of delivery vehicles, the delivery vehicle drivers in the queuing parking area/lot are allowed to drive into the LMD facility (e.g., the delivery vehicles are granted access to inside of the LMD facility). In some embodiments, one or more bay doors (or other traffic control barriers) are opened to allow the delivery vehicle drivers to drive into the LMD facility. In particular embodiments, other traffic control devices/systems (e.g., traffic lights, message boards, etc.) can also, or alternately, be used to provide one or more indications to the delivery vehicle drivers in the queuing parking area/lot. In certain embodiments, a traffic light can be illuminated in green color to provide the delivery vehicle drivers in the queuing parking area/lot with an indication that it is time to drive into the LMD facility.

Steps 114-126 describe the portion of the method 100 during which the items to be delivered by the LMD delivery vehicles are loaded into the LMD delivery vehicles. The details of how steps 114-126 can be performed can vary as described below. For example, FIGS. 2-7 illustrate various different traffic flow and item loading regimes. In each case, safety is paramount, and maximum productivity/throughput is intended.

Next in this description, steps 114-126 will be described at a relatively high level of generality. Following that, detailed descriptions will be provided in accordance with the examples illustrated in FIGS. 2-7 that show various traffic flow and item loading regimes that can be used to execute the steps 114-126.

In step 114 of the method 100, the LMD delivery vehicles are driven into the LMD facility and are parked in the farthest available designated parking spot. This ensures that all parking spots are utilized and that traffic flow in the LMD facility is organized, controlled, and predictable. Once the delivery vehicle is parked, the driver can shut off the engine of the delivery vehicle.

In step 116 of the method 100, the driver of the delivery vehicle exits his/her vehicle and, using his/her mobile device, scans a barcode, scans a QR code, takes a photo of the QR code, and/or otherwise enters a code to identify the particular parking spot in which his/her vehicle is parked. This step notifies the LMD process control system of the particular parking spots in which each of the delivery vehicles are located.

In step 118 of the method 100, the LMD process control system notifies a LMD facility worker to move a group of one or more particular items for loading into the delivery vehicles to the particular parking spots. The items to be delivered by the delivery vehicles can be grouped in accordance with an optimized LMD shipment plan (e.g., developed using route optimization software). For example, based on the addresses to which the items are to be delivered, the items can be compiled into groups so that the collective distance to be traveled by the delivery vehicles is minimized. In some embodiments, this step is performed automatically (e.g., as described below in reference to FIG. 8).

In step 120 of the method 100, the assigned groups of items are physically moved by the LMD facility workers to the corresponding, assigned delivery vehicles. In some embodiments, carts, bags, boxes, and the like can be utilized to execute this movement step. In some embodiments, this step is performed automatically (e.g., as described below in reference to FIG. 8).

In step 122 of the method 100, the delivery vehicle drivers load the items into the delivery vehicles. As each item is loaded, the delivery vehicle drivers scan the barcode of the items to indicate to the LMD process control system that the items have been transferred to the vehicles. This provides traceability of the items.

In step 124 of the method 100, when the delivery vehicle drivers are done loading the items into the delivery vehicles, the drivers move the empty cart to an area and then scans another code (e.g., barcode, QR code, etc.) to indicate that the loading process is completed.

In step 126 of the method 100, the delivery vehicle drivers return to his/her vehicle and then drives out of the LMD facility in the prescribed manner (as detailed further below). After leaving the LMD facility, the delivery vehicles follow a prescribed route to make the deliveries of the items. The driver scans the items at the time of transferring the items to the customers.

Figure 2:
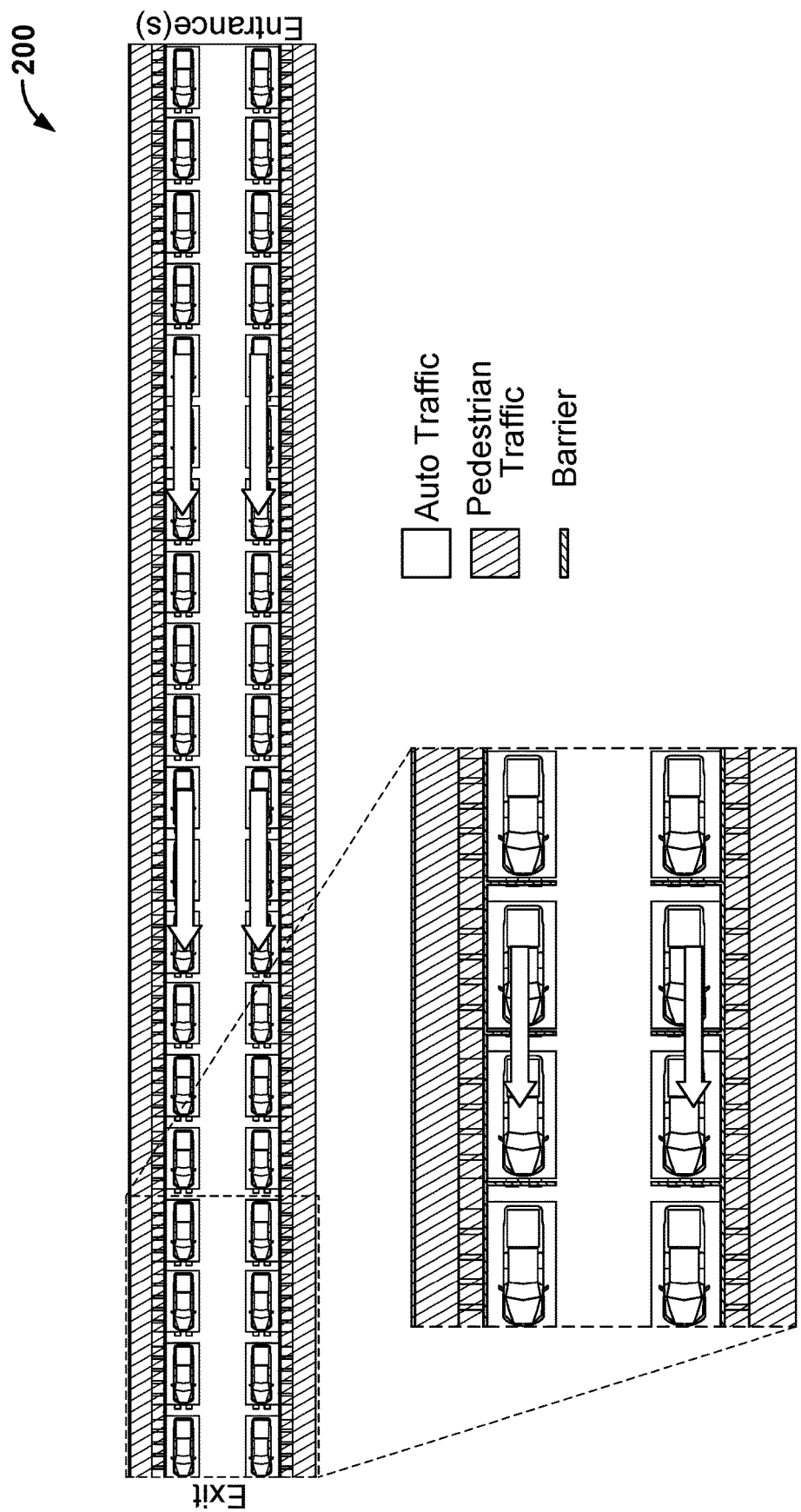
FIG. 2 is a schematic illustration of an example traffic control regime for use in a LMD facility while executing the method of FIG. 1.

FIG. 2 illustrates an example traffic control regime 200 that can be used in a LMD facility while executing the method of FIG. 1. In this traffic control regime 200, two rows of the delivery vehicles enter the LMD facility via one or more entrances at one end of the LMD facility (the right side in FIG. 2). No traffic is allowed in the space between the two rows of vehicles (except perhaps in the event that a particular vehicle has a breakdown in a parking spot). The vehicles proceed in the two rows and park in the farthest available designated parking spots (starting with open spots on the left side in FIG. 2). The parking spots can be designated by markings (e.g., lines, signage, etc.). In some embodiments, after the delivery vehicles are parked, a physical barrier can be optionally deployed between each of the vehicles. Such a physical barrier can be any suitable type of barrier such as, but not limited to, a gate, a barricade, a retractable skirt/belt barrier, pop up bollards, and the like. The physical barriers can promote safety and/or traffic control in some cases. The items are transported to the vehicle parking area along pedestrian traffic aisles running parallel to the parking spots. The delivery vehicles would exit the LMD facility together (e.g., in a batch) when the loading of all delivery vehicles is completed.

Figure 3:
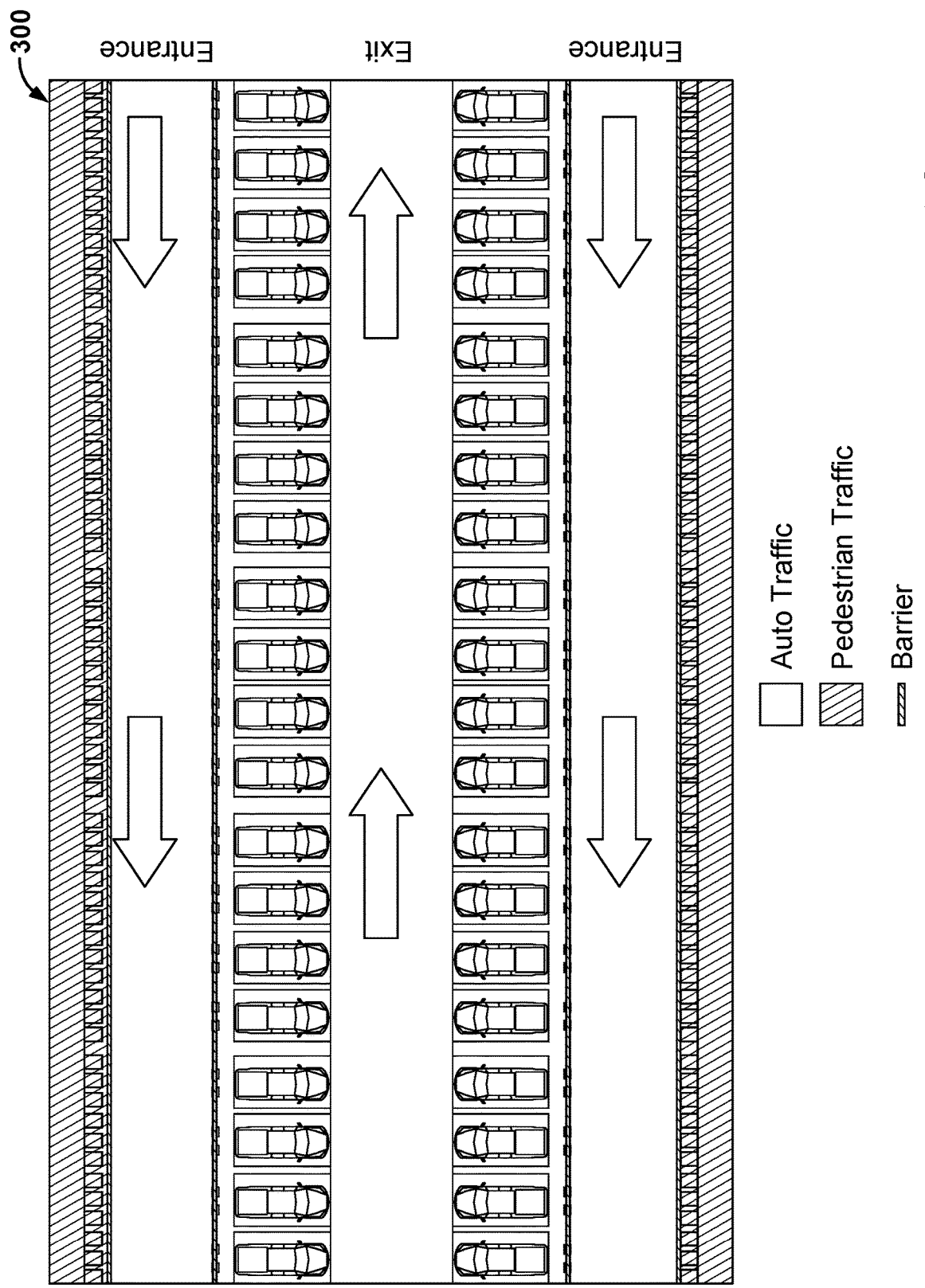
FIG. 3 is a schematic illustration of another example traffic control regime for use in a LMD facility while executing the method of FIG. 1.

FIG. 3 illustrates another example traffic control regime 300 that can be used in a LMD facility while executing the method of FIG. 1. In this traffic control regime 300, two rows of the delivery vehicles enter the LMD facility via one or more entrances at one end of the LMD facility (the right side in FIG. 3). The drivers turn 90° to pull into the farthest available designated parking spot. In some embodiments, after all of the parking spots are filled by the delivery vehicles, one or more barriers are deployed behind the delivery vehicles. The items are transported to the vehicle parking area along pedestrian traffic aisles running parallel to the incoming traffic lanes. The LMD facility workers would transfer the carts carrying the items to the drivers either at the interface between the pedestrian traffic aisles and the incoming traffic lanes, or at the interface between the incoming traffic lanes and the parking areas. In some embodiments, the delivery vehicles would pull forward exit the LMD facility one after another (e.g., in a batch) using the middle traffic lane when the loading of all delivery vehicles is completed. In particular embodiments, each driver could pull forward into the middle traffic lane to exit the LMD facility as soon as his/her vehicle is loaded and it is safe to do so.

Figure 4:
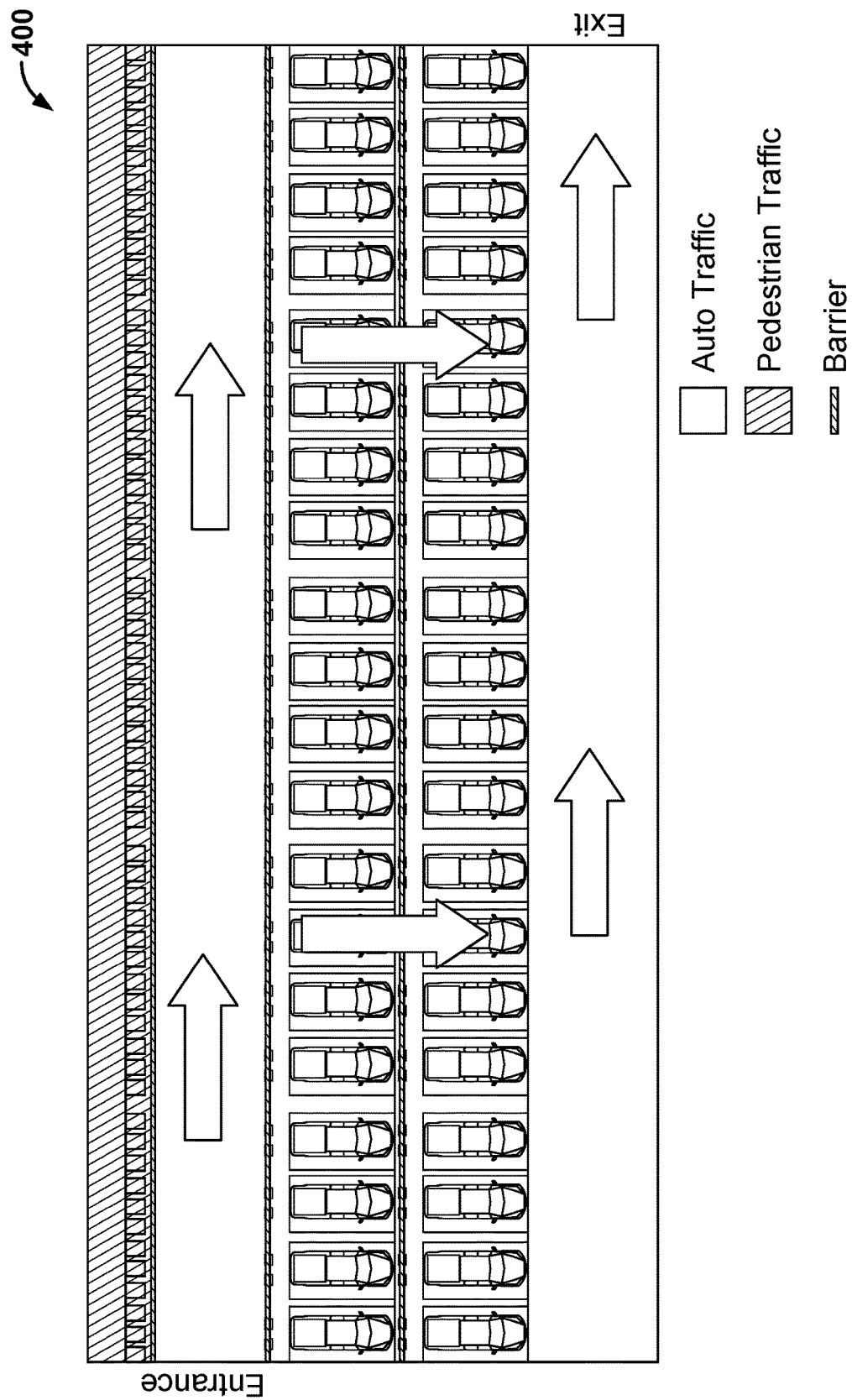
FIG. 4 is a schematic illustration of another example traffic control regime for use in a LMD facility while executing the method of FIG. 1.

FIG. 4 illustrates another example traffic control regime 400 that can be used in a LMD facility while executing the method of FIG. 1. In this traffic control regime 400, a single row of the delivery vehicles enter the LMD facility an entrance at one end of the LMD facility (the left side in FIG. 4). The drivers turn 90° to pull into the farthest available designated parking spot. Two rows of designated parking spots are filled in this manner (starting with the bottom-most row in FIG. 4). One or more barriers can be deployed between the rows of parking spaces, behind the second row of parking spaces, and/or between the pedestrian traffic aisle and the vehicle traffic aisle. The items are transported to the vehicle parking area along a pedestrian traffic aisle running parallel to the incoming traffic lane. The LMD facility workers would transfer the carts carrying the items to the drivers either at the interface between the pedestrian traffic aisle and the incoming traffic lane, or at the interface between the incoming traffic lane and the parking area. The delivery vehicles would pull forward exit the LMD facility one after another (e.g., in a batch) using the exit traffic lane when the loading of all delivery vehicles is completed. In particular embodiments, each driver of the first row of parking spaces could pull forward into the exit traffic lane to exit the LMD facility as soon as his/her vehicle is loaded and it is safe to do so.

Figure 5:
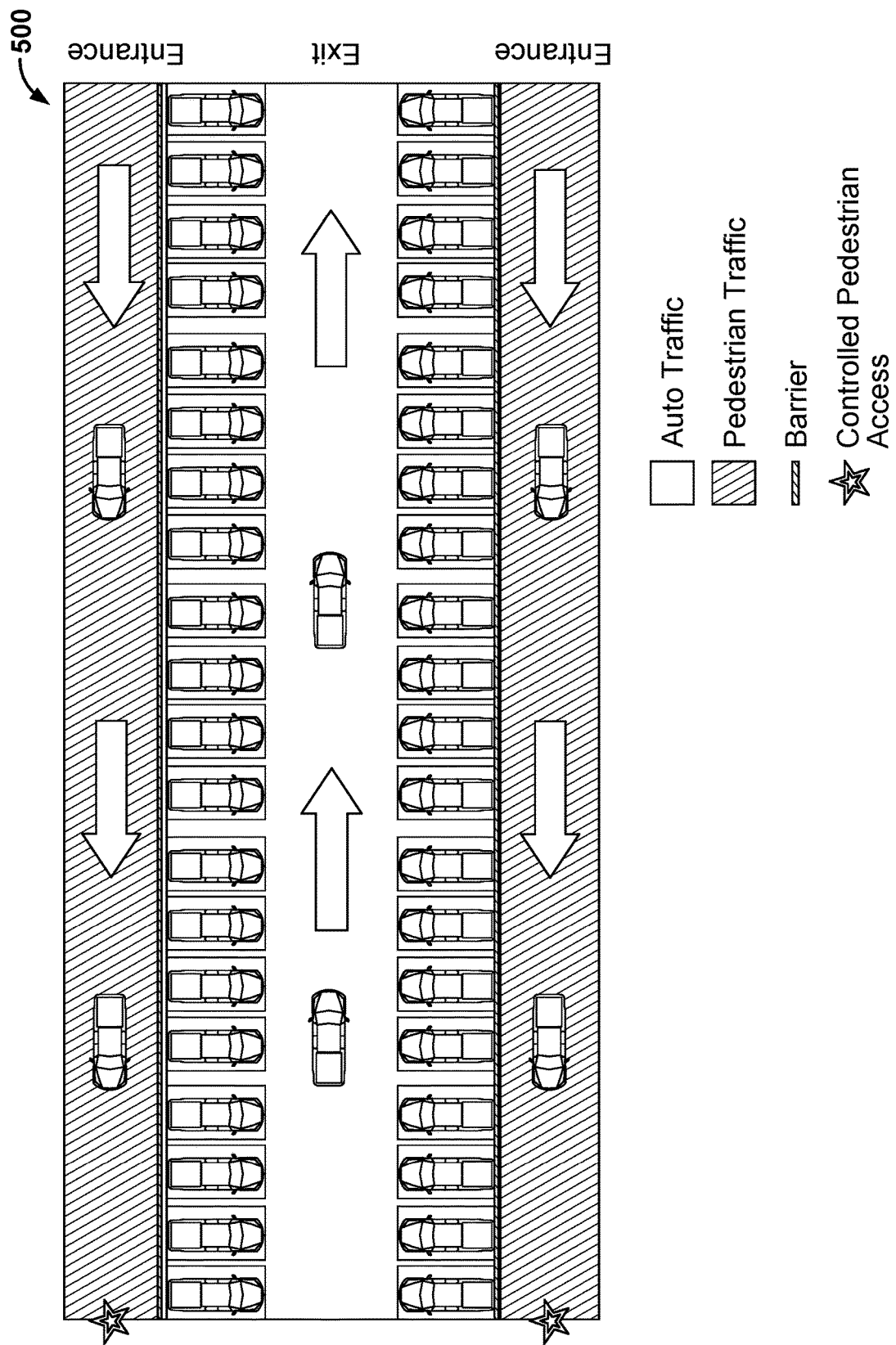
FIG. 5 is a schematic illustration of another example traffic control regime for use in a LMD facility while executing the method of FIG. 1.

FIG. 5 illustrates another example traffic control regime 500 that can be used in a LMD facility while executing the method of FIG. 1. This traffic control regime 500 is a variation of the traffic control regime 300 with the difference being that the incoming traffic lanes are converted into pedestrian traffic aisles when all of the delivery vehicles are in the parking spaces.

Figure 6:
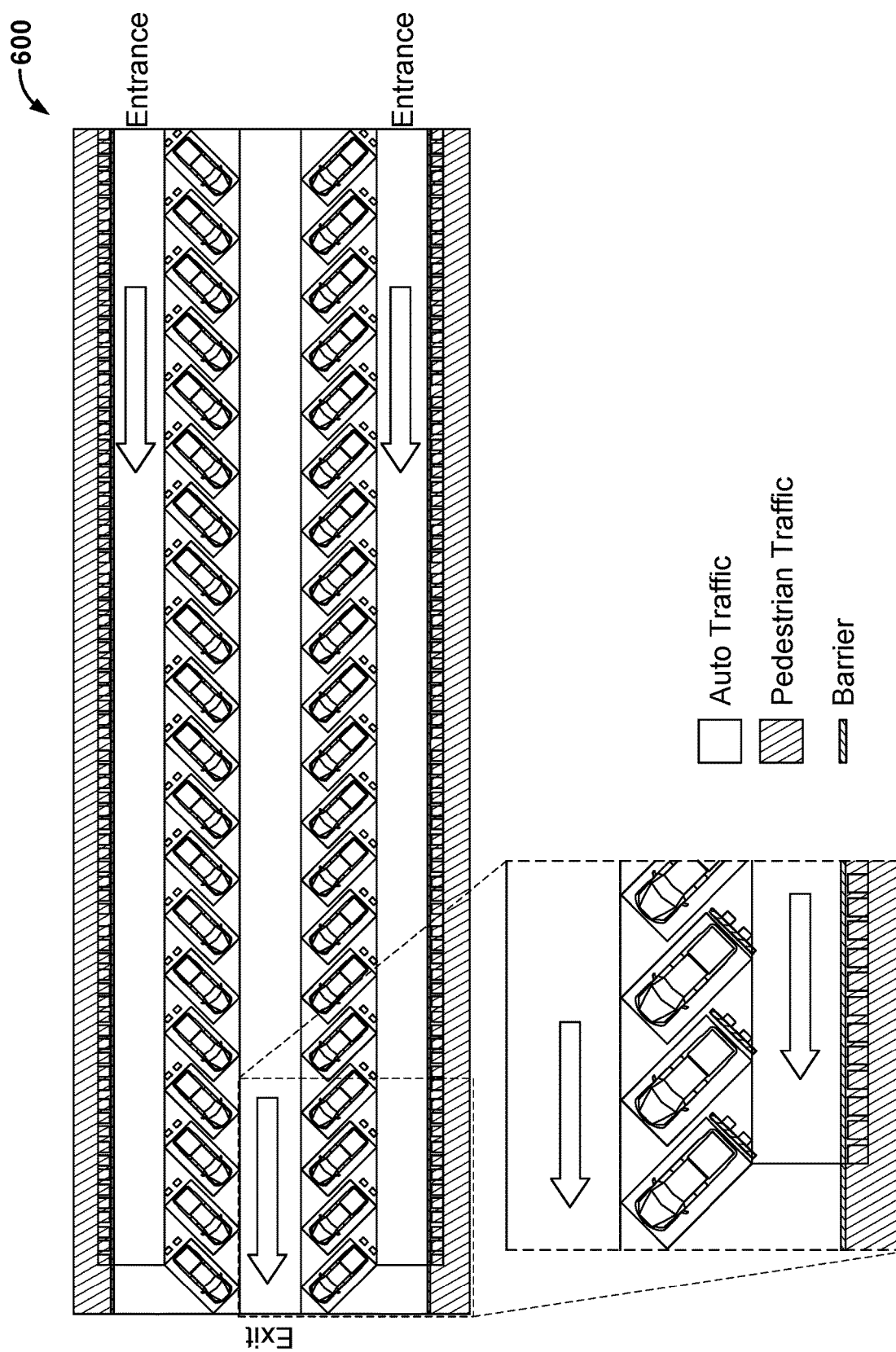
FIG. 6 is a schematic illustration of another example traffic control regime for use in a LMD facility while executing the method of FIG. 1.

FIG. 6 illustrates another example traffic control regime 600 that can be used in a LMD facility while executing the method of FIG. 1. In this traffic control regime 600, two rows of the delivery vehicles enter the LMD facility via one or more entrances at one end of the LMD facility (the right side in FIG. 6). The drivers turn 45° to pull into the farthest available designated parking spot. In some embodiments, after all of the parking spots are filled by the delivery vehicles, one or more barriers are deployed behind the delivery vehicles. The items are transported to the vehicle parking area along pedestrian traffic aisles running parallel to the incoming traffic lanes. The LMD facility workers would transfer the carts carrying the items to the drivers either at the interface between the pedestrian traffic aisles and the incoming traffic lanes, or at the interface between the incoming traffic lanes and the parking areas. In some embodiments, the delivery vehicles would pull forward exit the LMD facility one after another (e.g., in a batch) using the middle traffic lane when the loading of all delivery vehicles is completed. In particular embodiments, each driver could pull forward into the middle traffic lane to exit the LMD facility as soon as his/her vehicle is loaded and it is safe to do so.

Figure 7:
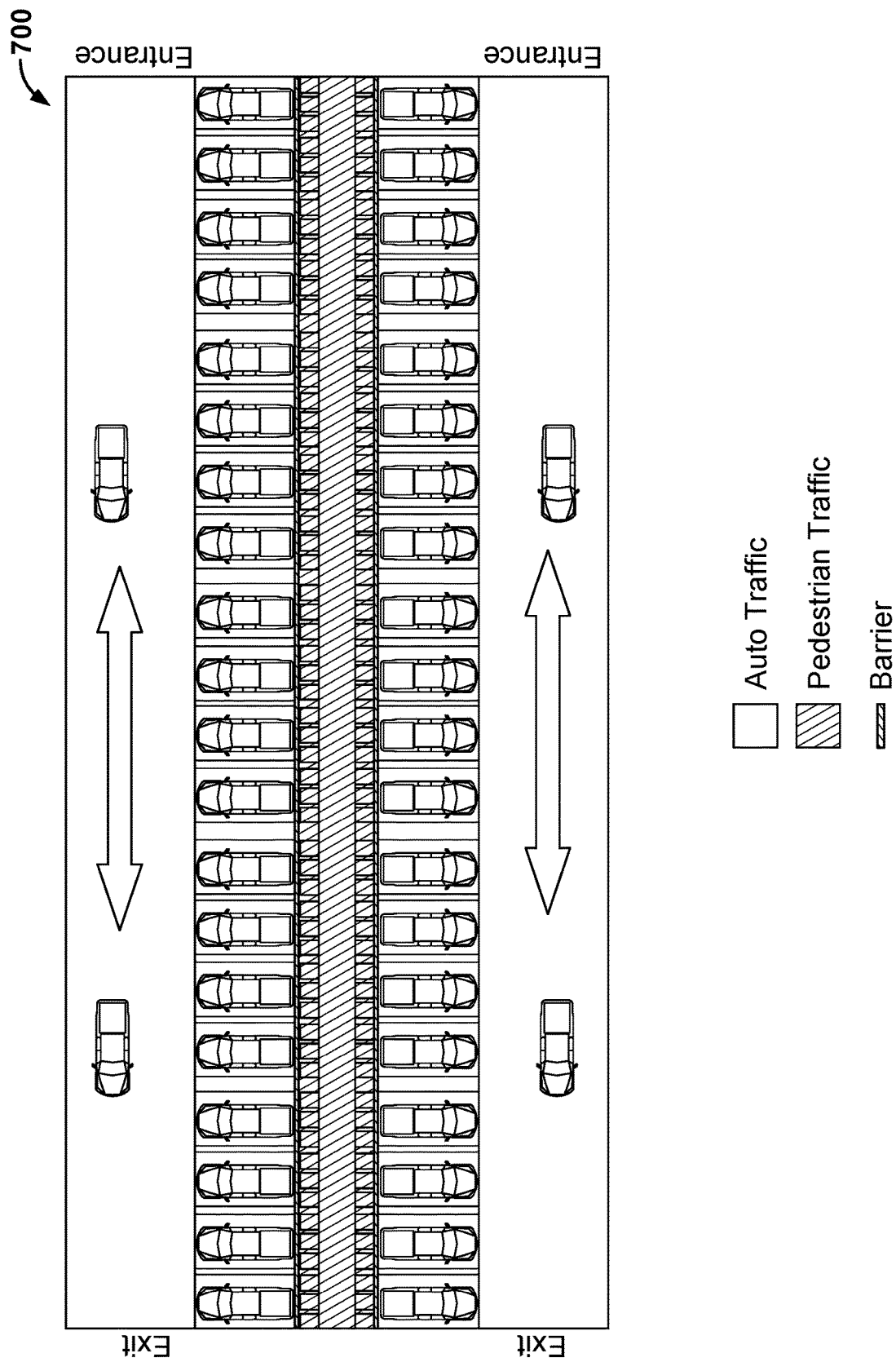
FIG. 7 is a schematic illustration of another example traffic control regime for use in a LMD facility while executing the method of FIG. 1.

FIG. 7 illustrates another example traffic control regime 700 that can be used in a LMD facility while executing the method of FIG. 1. In this traffic control regime 700, two rows of the delivery vehicles enter the LMD facility via one or more entrances at one end of the LMD facility (the right side in FIG. 7). The delivery vehicles stop in the incoming traffic lanes and back into the designated parking spots. The items are transported to the vehicle parking area along a central pedestrian traffic aisle running between the two rows of parking spots. The LMD facility workers would transfer the carts carrying the items to the drivers at the interface between the central pedestrian traffic aisle and the parking areas. In some embodiments, the delivery vehicles would pull forward exit the LMD facility one after another (e.g., in a batch) using the outer traffic lanes when the loading of all delivery vehicles is completed. In particular embodiments, each driver could pull forward into the outer traffic lane to exit the LMD facility as soon as his/her vehicle is loaded and it is safe to do so.

Figure 8:
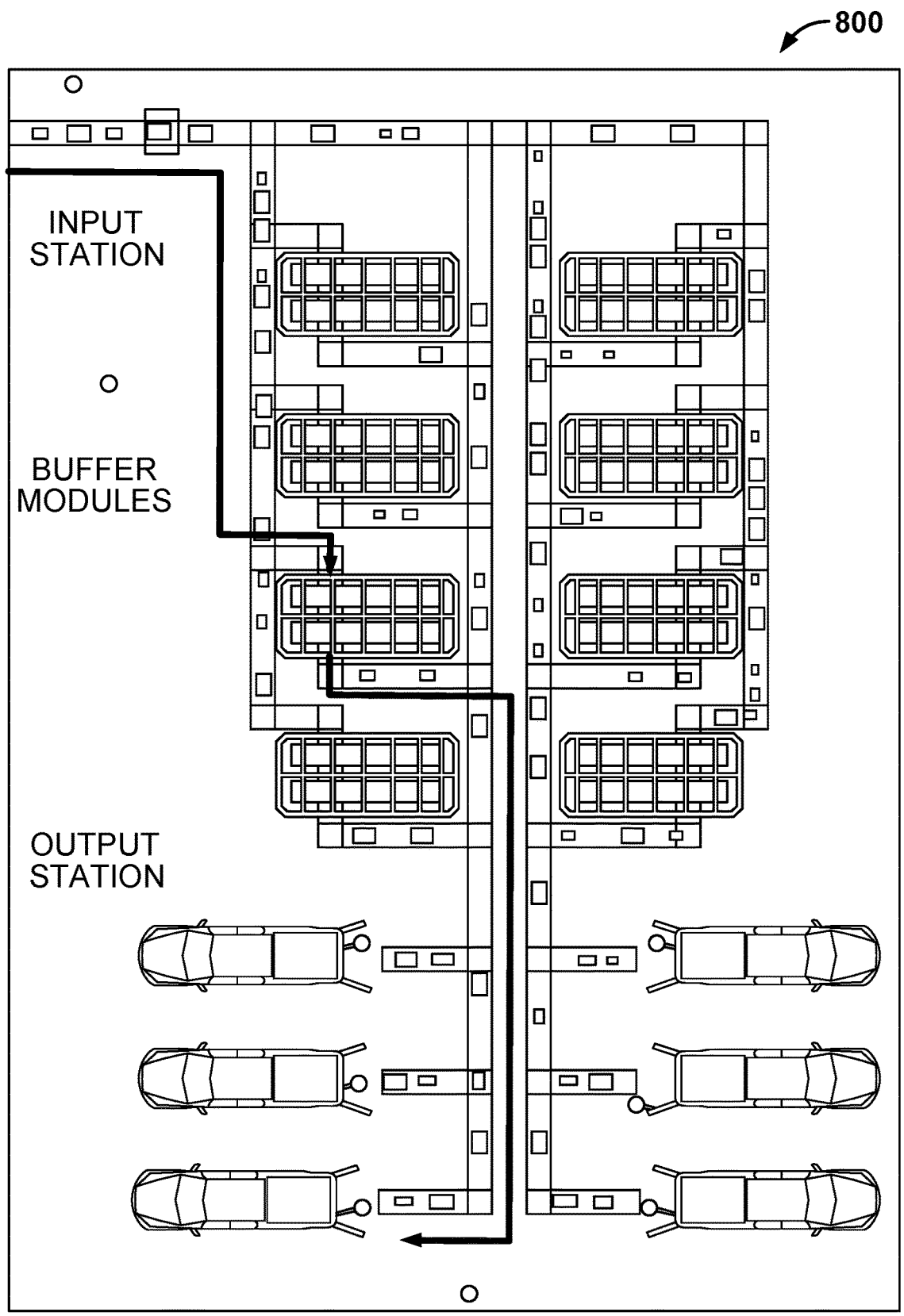
FIG. 8 illustrates the use of an automated inventory buffer system that can be used to automate certain steps of the method of FIG. 1.

FIG. 8 illustrates the use of an automated inventory buffer system 800 that can be used to automate certain steps of the method of FIG. 1. In some embodiments, the automated inventory buffer system 800 can include an artificial intelligence ("AI") algorithm and mechanical package buffering system to hold packages to be delivered using the LMD process in a space efficient manner. The use of the automated inventory buffer system 800 can facilitate improved driver route optimization prior to package dispatch from the LMD facility. The use of the automated inventory buffer system 800 can also facilitate automation that can reduce the extent of human involvement with the LMD process.

The automated inventory buffer system 800 can utilize an ASRS (automated storage & retrieval system) to buffer item packages during a time period to allow software algorithms to optimize delivery driver routes (route optimization).

Upon route finalization, item packages are discharged in a priority sequence for load batching and loading into delivery vehicles.

In the depicted embodiment, the automated inventory buffer system 800 includes an input station, one or more buffer modules, and a plurality of output stations. The input station comprises conveyance system (e.g., using conveyors, mobile robots, etc.) by which items that are ordered for delivery (e.g., home delivery) are inducted into the buffer module(s) area. In some embodiments, the items are transferred to the automated inventory buffer system 800 from retail stores, suppliers, and/or other warehouses, without limitation. As the items are conveyed via the input station, the barcodes of the items are scanned. Thereafter, the scanned items are controlled and traced through the remainder of the automated inventory buffer system 800.

From the input station, the items enter the one or more buffer modules. The one or more buffer modules automatically store (buffer) the items on a temporary basis. In some embodiments, the one or more buffer modules comprise one or more ASRS modules. While the items are buffered in the ASRS modules, the route optimization software algorithms can run/execute to determine optimized delivery routes for the items being stored in the ASRS modules.

The output station comprises one or more LMD loading stations and associated LMD delivery vehicle parking spaces. When LMD delivery vehicles are parked in the LMD delivery vehicle parking spaces, groups of items from the one or more buffer modules are automatically transported from the buffer modules to the assigned LMD delivery vehicle parking spaces for loading into the LMD delivery vehicles. In some embodiments, the automatic transportation of the items is performed using autonomous mobile robots (AMRs). In some embodiments, the automatic transportation of the items is performed using item-carrying vehicles that function within the buffer modules, and that can leave the physical framework of the buffer modules to travel to the output station(s).

In particular embodiments, the sequence of items conveyed from the buffer modules to the output station for loading in to a particular LMD delivery vehicle can be in reverse order of the delivery sequence (also referred to as "reverse stop order"). That is, the item(s) to be delivered last by the LMD delivery vehicle can be conveyed first to the output station. That way the LMD delivery vehicles will be loaded in a manner that is efficient for making the deliveries (with the first items to be delivered being the most accessible of the items in the LMD delivery vehicles).

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A computer-implemented method for automation of access-control traffic devices for use in processing direct-to-customer shipments at a building for loading delivery vehicles, the method comprising:

receiving, by a process control system over a computer network, an electronic message, from a driver device that is associated with a vehicle driver, indicating that a vehicle of the vehicle driver is ready to enter the building with automated access control, wherein the process control system comprises one or more programable processors and one or more storage systems storing instructions for the programable processors to execute;

providing, by the process control system over the computer network, a notification to the driver device of the vehicle driver, the notification comprising a point in time at which the driver is assigned to arrive at the building;

receiving, by the process control system, an indication that the vehicle of the vehicle driver has arrived at the building;

providing, by the process control system over the computer network, a first code to the driver device of the vehicle driver;

receiving the first code from the vehicle driver;

in response to receiving the first code, granting, by the process control system, the vehicle of the vehicle driver access to a queuing parking lot of the building while at least one vehicle of a previous batch of delivery vehicles are in a loading-area of the building, comprising actuating by the process control system, a first automated traffic-control device to move from a first access-preventing state to a first access-granting state, the first access-preventing state configured to physically block vehicle access to the queuing parking lot of the building and the first access-granting state configured to physically open a travel path to the queuing parking lot;

receiving, by the process control system, an indication that the loading-area of the building is empty of a previous batch of delivery vehicles;

granting, by the process control system responsive to the received indication that the loading-area of the building is empty of a previous batch of delivery vehicles, the vehicle access to the building comprising actuating, by the process control system, a second automated traffic-control device from a second access-preventing state to a second access-granting state, the second access-preventing state configured to physically block vehicle access to the building from the queuing parking lot and the second access-granting state configured to open a travel path into the building;

receiving, by the process control system over the computer network from the driver device, an indication of a particular parking spot of a plurality of parking spots in the building in which the vehicle is parked;

providing, by the process control system, a notification to move one or more order items to the particular parking spot;

receiving, by the process control system, one or more second codes corresponding to the one or more order items; and receiving, by the process control system, a second code that indicates that the one or more order items have been loaded into the vehicle.

2. The method of claim 1, wherein the driver device is a smart phone running an application configured to render the code as a code-rendering.

3. The method of claim 2, wherein the code-rendering is a QR code.

4. The method of claim 3, wherein receiving the indication that the vehicle has arrived at the building comprises receiving a scan of the QR code.

5. The method of claim 1, wherein the first automated traffic-control device comprises a movable barrier to the queuing parking lot.

6. The method of claim 1, wherein the second automated traffic-control device comprises a door sized, when in the access-granting state, to allow the vehicle to enter the building.

7. The method of claim 6, wherein the second automated traffic-control device further comprises a selectively illuminable traffic control light.

8. The method of claim 1, wherein the receiving the electronic message comprising the indication of the particular parking spot in the building in which the vehicle is parked comprises receiving a code corresponding to the particular parking spot.

9. The method of claim 1, wherein the one or more order items are grouped together based on having delivery addresses within a certain geographical area.

10. The method of claim 1, wherein the receiving one or more codes corresponding to the one or more order items comprises receiving a barcode that is scanned from each of the one or more order items.

* * * * *